United States Patent Office 2,952,644
Patented Sept. 13, 1960

2,952,644
METHOD FOR FORMING ALUMINA PARTICLES

Donald L. Holden, Des Plaines, Ill., assignor, by mesne assignments, to Universal Oil Products Company, Des Plaines, Ill., a corporation of Delaware No Drawing. Filed Feb. 17, 1958, Ser. No. 715,513

6 Claims. (Cl. 252—465)

This invention relates to a method for forming particles of alumina and particularly to a method for forming large alumina particles from alumina powder.

Alumina, which is aluminum oxide and hydrated alumina oxide, is a material that is useful for many processes. Alumina, when properly formed, is highly porous and contains extremely large surface area per unit of volume. Its adsorptive qualities make it useful as an adsorbent for selectively removing impurities from solutions and make it useful for a desiccant. More important, alumina exhibits excellent qualities as a catalyst and is widely used as a support for and co-catalyst with many other substances such as metals of groups V, VI, VII and VIII of the periodic table.

Alumina is readily formed as a powder by precipitating aluminum hydroxide from salt solutions and heating to a high temperature to drive off some of the water of hydration. The fine powder is difficult to use as a bed of material for treating a fluid because of its dense packing quality which reduces the flow rate of the fluid and because of the difficulty of maintaining a bed of material of fine particle size without high losses of particles. It has accordingly been found very useful and, in fact, almost essential to use alumina, or composites containing alumina, as a bed of large particles, that is, particles of $1/8''$ in diameter or greater, including particles as large as $1''$ in diameter or greater.

To obtain large particles of alumina, many methods have been employed. One commonly used method is pelleting the alumina is mixed with a suitable binder such as Sterotex or other hydrocarbonaceous material and the mixture of powder and binder is processed with a punch and die type pilling device which yields hard agglomerates of powder. The difficulty with this method is that a punch and die operation is a fairly expensive one requiring elaborate machinery which requires considerable maintenance. In addition, the particles must be tightly compacted and, therefore, quite dense in order to acquire the required strength and anything that attacks the bonding material will cause the particles to disintegrate.

Another method for making large particles of alumina is to produce an alumina hydrosol which is a liquid capable of gelling into solid alumina under the proper conditions. The alumina hydrosol is then dispersed as spheres into a gelling medium wherein the droplets or spheres become solid and result after finishing treatments in hard particles of alumina. A difficulty with the sphere dropping method is that large droplets cannot be formed and the process is, therefore, limited to applications where small, spherical particles can be used. Another difficulty is that alumina hydrosol is a very unstable material which is difficult and expensive to make, difficult to store and use and, therefore, requires expensive special techniques for production of a product.

The simple methods for making particles are extrusion or trituration. In order to extrude or triturate alumina particles, alumina powder is mixed with some type of liquid bonding agent to form a dough which, after a setting period, bonds all of the fine particles of alumina powder into an agglomerate of the desired size and shape. Various bonding materials are used, however, the most successful are those which peptize the surface of the small powder particles so that the resulting locally formed sol causes the surfaces of two adjacent particles to merge. This has been accomplished in two ways. First, the particles have been blended with solutions of aluminum salts of strong acids which apparently either react with the alumina of the particles or hydrate themselves to form a bond. The other method employed is to use the strong acid itself so that it reacts with the alumina particle to form an alumina hydrosol in situ which eventually causes the surfaces of adjacent particles to merge and, therefore, bonds the particles. The strong acids which produce the desired effect are those which form hydrolyzable aluminum salts and they include hydrochloric acid, sulfuric acid, nitric acid, acetic acid and formic acid. The extruded or triturated particles resulting from such a bond are hard, resistant to abrasion and suitable for use in a process, however, it has been found that particles bonded with chloride ion present, i.e. HCl or $AlCl_3$, disintegrate into a powder when heated to high temperatures, that is, temperatures of about 200° C. or greater, and particles bonded with the other strong acids disintegrate completely in aqueous environments.

Particularly when used as a catalyst support, it is extremely important that the alumina particles are stable at high temperatures. This is important for at least two reasons, first that many catalytic processes are effected at high temperatures and second, many low temperature catalytic processes require a high temperature activation of the catalyst. For such processes, the particles bonded with chloride ion cannot be used since they would disintegrate either during catalyst activation or at reaction conditions.

It is also extremely important to have particles that are stable in aqueous environments since lacking this characteristic, the particles may only be used in completely anhydrous systems, cannot be shipped where moisture or high humidity would cause their disintegration and cannot be used to produce catalysts by the impregnation method wherein alumina particles are composited with metals by being immersed in solutions of their salts. Since the impregnation method of catalyst preparation is one of the most common and most successful methods, water-sensitivity in a particle would severely limit its utility as a catalyst support. I have found a method for bonding alumina powders into strong particles which are stable at high temperatures and in aqueous environments. In addition, the method employs inexpensive forming procedures such as extrusion or trituration for forming the particles.

It is an embodiment of this invention to provide an improved method for making alumina powders into larger particles which comprises commingling alumina powder with sufficient water and mineral acid which forms a hydrolyzable aluminum salt to produce a dough, forming said dough into shaped particles, drying said particles, treating the dried particles with a fixing gas selected from the group consisting of hydrogen, hydrogen sulfide and carbon monoxide and calcining the resultant formed particles.

In another embodiment, this invention relates to the preparation of a catalytic mass by impregnating the formed calcined particles with suitable metals having catalytic activity.

The mechanism of the reaction of the fixing gas with the bonding material is not definitely known, however, it is thought that the strong acids form oxyaluminum compounds such as aluminum oxychloride, aluminum oxysulfate, etc., which are capable of hydrolyzing and thereby setting into alumina producing a bond between particles. The fixing gases of this invention, it is thought, promote the setting reaction to form a heat-stable, water-insensitive bond of substantially the same material as the particles. As will be demonstrated in the following examples, the method of this invention produces particles by simple inexpensive methods and the particles produced have great physical strength and resist heat and water.

The process of this invention contemplates preparing aggregates or large size pellets from alumina powder. The alumina employed may be natural alumina such as purified bauxite or synthetic alumina such as the material prepared by precipitating aluminum hydroxide from solutions of aluminum salts such as aluminum chloride aluminum sulfate, aluminum nitrate, etc. or it may be prepared by spray drying of alumina hydrosols, grinding dried alumina prepared from hydrosols, reacting aluminum metal with water in the presence of a mercury or amine catalyst, etc. The preferred alumina is in the trihydrate form although alumina in other states of hydration may be employed.

The bonding agent of this invention consists of a strong acid which forms a hydrolyzable aluminum salt, however, the acid will normally be employed in water solution. The aqueous acid employed preferably contains from about 20 to about 90% acid and is used sufficiently dilute so that the alumina is not entirely dissolved but in sufficient abundance so that a workable dough or a paste of the powder may be formed with the aqueous bonding medium. As heretofore stated, the acids employed may be hydrochloric acid, sulfuric acid, nitric acid, acetic acid, formic acid, etc., and there must be at least an effectual amount of acid in the aqueous bonding fluid to cause the desired effect, that is, to adequately bind the powder. The dough may be shaped into particles which will set up to hard agglomerates. The particles may be cylinders, hollow cylinders, spheres, irregularly shaped agglomerates, saddles, rings, etc. The shape of the particle is determined by its ultimate use and it may be shaped by employing suitably formed extrusion dies or receiving pockets in a plate.

The shaped set particles must be dried and the term drying implies removing liquid water by supplying sufficient sensible and latent heat. The drying process should be carried on primarily to remove liquid water, however, some water of hydration may also be removed. Drying is usually effected between 100 and 300° C. for whatever time interval is necessary and it is preferably effected between 150 and 200° C. for a period of from about 2 to about 8 hours. The treatment with fixing gas may be concurrent with the drying step or it may be effected after the drying period and the treating gas treatment is generally effected at temperatures of from about 200° C. to about 700° C. for durations of from about 10 minutes to 3 hours or more, depending upon the temperature, the bonding material and the fixing gas employed. The fixing process may be effected by passing hot fixing gas through a bed of wet or dry particles, by passing particles on a belt through a gas chamber, or it may be effected by placing pans of particles in an oven in which an atmosphere of fixing gas is maintained. The fixing gases employed, hydrogen, hydrogen sulfide or carbon monoxide, may be employed in purified form, mixed with each other or mixed with other compatible gases which may be impurities or diluents. Compatible gases are those which do not exert an adverse influence on the fixing gases and these include such gases as nitrogen, carbon dioxide, neon, etc. After the particles have been subjected to the fixed treatment, they may be activated by calcination which is usually effected by heating in an oxidizing atmosphere at high temperatures, for example, at 600° C. for a period of from about ½ hour to about 8 hours or more.

The calcined particles may be used per se or may be impregnated with catalytic metals to increase their utility. Impregnation is usually effected by immersing formed particles in a solution of salts of the catalytic metals. The solution is then evaporated so that the metal or a compound thereof is impregnated into the alumina and upon drying and calcination, the metal oxide is formed. Appropriate salts may be used, for example, when it is desired to have an alumina-platinum catalyst, chloroplatinic acid or platinum chloride may be used, when it is desired to employ an alumina-nickel catalyst, nickel nitrate or nickel sulfate may be used. When it is desired to have an iron catalyst, iron nitrate or iron chloride may be used, when it is desired to have a molybdenum catalyst, molybdenum nitrate or ammonium molybdate may be used, etc. When the catalyst is finished and the metals are in their oxide form the catalyst may be further activated by reducing the metal with hydrogen, sulfiding it with hydrogen sulfide, or any other activation treatment. The catalyst may be impregnated by impregnating the powdered alumina prior to compositing as particles by making the dough or paste with a metal salt as part of the bonding solution. In many cases, however, the catalyst activity of the ultimate composite is reduced by impregnating prior to forming the alumina particles. The alumina also may be impregnated after treatment with fixing gases but before calcination.

The following examples are presented to illustrate the process of this invention and to contrast it with presently employed methods for producing alumina particles, however, not with the intention of limiting this invention to the specific conditions and materials used.

*Example 1*

31 grams of alumina trihydrate was mulled with 2.8 milliliters of concentrated sulfuric acid diluted to 11 milliliters of water. The resultant dough was triturated into a plate containing cylindrical holes ¼" in diameter and ¼" deep and the resulting pills of alumina were dried at 200° C. The dried pills were extremely strong and hard and showed little tendency to powder, however, they disintegrated completely and almost immediately when placed in water. Another batch of pills after drying at 200° C. were treated with hydrogen at a temperature of 500° C. for 1 hour. The treated pills were extremely strong and showed little tendency to powder and when placed in water they weakened only slightly. The pills were then impregnated with solutions of cobalt and molybdenum salts which were evaporated yielding a composite of alumina, cobalt and molybdenum in the form of large strong hard particles. The cobalt-molybdenum-alumina composite prepared by the impregnation method is an extremely useful and active catalyst for hydrotreating contaminated hydrocarbons to reduce the sulfur content of the hydrocarbons almost completely and the nitrogen concentration of hydrocarbon substantially completely when the hydrocarbon is contacted with the catalyst at temperatures in the range of 700° F. and pressures in excess of 200 p.s.i. in the presence of hydrogen.

Example II 16 milliliters of solution containing 0.3 gram of ammonium molybdate and 8.6 milliliters of solution containing 0.6 gram of cobalt sulfate heptahydrate and 5.6 milliliters of concentrated sulfuric acid were mulled into 62 grams of alumina trihydrate powder. Enough additional water was added to make a workable dough, which was triturated into ¼" by ¼" cylindrical particles which in turn were dried at 200° C. and calcined for 1 hour at 600° C. The pills were strong, hard and dust-free both before and after calcination, however, when placed in water they slowly disintegrated into powder. A portion of the pills, after drying but previous to calcination, were treated with hydrogen for 1 hour at 500° C. The resulting pills were strong and dust-free and maintained their strength when placed in water. The pills, which were a composite of alumina, cobalt and molybdenum, are a satisfactory catalyst for removing sulfur and nitrogen impurities from hydrocarbons, however, they will not remove nitrogen impurities to the extent of the impregnated catalyst particles prepared in accordance with Example I.

Example III

Pills of alumina, cobalt and molybdenum prepared as in Example II were treated after drying but prior to calcination with hydrogen at 400° C. for 15 minutes. The treated pills were strong both before and after calination and maintained their strength when placed in water.

Example IV 62 grams of alumina trihydrate was mulled with 16 milliliters of ammonium molybdate solution containing 0.3 gram of ammonium molybdate and 8.6 milliliters of solution containing 0.6 gram of cobalt sulfate heptahydrate and 11.7 grams of $Al_2(SO_4) \cdot 18H_2O$. This mixture is almost identical with the dough prepared in Example II with regard to sulfate ion, cobalt ion and molybdenum ion concentration. Sufficient water was added to make a workable dough which was then triturated, dried at 200° C. and calcined at 600° C. The pills were strong and hard both before and after calcination, however, when placed in water they disintegrated completely in a very short time. A portion of the pills made in accordance with this example were treated with hydrogen for 1 hour at 500° C. after drying but prior to calcination and this treatment resulted in hard pills, however, when placed in water their strength was severely reduced although they did not disintegrate completely into powder. The pills of this example, when treated with hydrogen, may be exposed to small quantities of moisture for limited periods without too great damage being done, however, they are not water-resistant as the pills of the previous examples and accordingly, could not be used to prepare a catalyst by impregnation techniques.

Example V 31 grams of alumina trihydrate was mulled with 11 milliliters of 38% hydrochloric acid and the resultant dough was was triturated. The pills were dried at 200° C. and there resulted extremely weak pills which are not further weakened by exposure to water. When the pills are activated at 520° C. they disintegrate. A portion of the dried pills, prior to calcination, were treated with hydrogen at 200° C. for ½ hour. Subsequent to the hydrogen treatment, the pills were calcined at 520° C. and they remained as strong as before.

Example VI

Pills were prepared similar to the pills of Example V except that aluminum chloride hexahydrate was employed to provide the same quantity of chloride ion as the HCl of the previous example. Upon trituration of the resulting dough, pills which lost their strength upon heating to 200° C. resulted and treatment with hydrogen did not effect sufficient improvement to make the pills useful as catalyst supports.

Example VII

Alumina trihydrate was mulled with sufficient cobalt nitrate and molybdic acid to form a dough which was triturated and which upon drying disintegrated completely to powder.

Example VIII

Triturated pills were produced exactly as those in Example II, however, prior to calcination and after drying, the pills were treated with $H_2S$ for 1 hour at 550° C. The treated pills, after calcination, are strong, hard, and maintain their strength when placed in water.

Example IX

Triturated pills were prepared exactly in accordance with Example II, however, after drying and prior to calcination, the pills were treated with carbon monoxide for 1 hour at 550° C. The resultant pills are strong and and hard and maintain their characteristics when immersed in water.

As may readily be seen from the foregoing examples, by employing the fixing gases of the invention, triturated pills are produced which have the ability to withstand high temperatures and aqueous environments. It is also demonstrated that strong acids are required for the process in order to get improved results over the use of aluminum salts of those acids.

I claim as my invention:

1. A method for making alumina powder into large alumina particles which comprises commingling alumina powder with an acid which forms a hydrolyzable aluminum salt and sufficient water to produce a dough, the acid being in sufficient amount to bind said powder, forming said dough into large particles, drying said particles, treating the dried particles with a fixing gas selected from the group consisting of hydrogen, hydrogen sulfide and carbon monoxide at a temperature of from about 200° to about 700° C. for a time period of from about 10 minutes to about 3 hours, and calcining the resultant formed particles.

2. The process of claim 1 further characterized in that said acid comprises sulfuric acid.

3. The process of claim 1 further characterized in that said acid comprises hydrochloric acid.

4. A method for making alumina powder into large particles of alumina which comprises commingling alumina powder with an acid selected from the group consisting of hydrochloric, sulfuric, nitric, acetic and formic acids in sufficient amount to bind said powder and sufficient water to produce a dough, forming said dough into particles, drying said particles, treating the dried particles with a fixing gas selected from the group consisting of hydrogen, hydrogen sulfide and carbon monoxide at a temperature of from about 200° C. to about 700° C. for a time period of from about 10 minutes to about 3 hours, and calcining the resultant particles.

5. The method for making large particles of catalyst which comprises comingling alumina powder with an acid selected from the group consisting of hydrochloric, sulfuric, nitric, acetic and formic acids in sufficient amount to bind said powder and sufficient water to produce a dough, forming said dough into large particles, drying said particles, treating the dried particles with a fixing gas selected from the group consisting of hydrogen, hydrogen sulfide and carbon monoxide at a temperature of from about 200° to about 700° C. for a time period of from about 10 minutes to about 3 hours, calcining the resultant formed particles, immersing the calcined particles in a solution of a salt of a catalytic metal, evaporating said solution and oxidizing the resultant composite.

6. The method for making large particles of catalyst which comprises commingling alumina powder with a solution of a salt of a catalytic metal, an acid selected from the group consisting of hydrochloric, sulfuric, nitric, acetic and formic acids in sufficient amount to bind said powder and sufficient water to produce a dough, forming said dough into large particles, drying said particles, treating the dried particles with a fixing gas selected from the group consisting of hydrogen, hydrogen sulfide and carbon monoxide at a temperature of from about 200° to about 700° C. for a time period of from about 10 minutes to about 3 hours, and calcining the resultant formed particles.

References Cited in the file of this patent
UNITED STATES PATENTS

| | | |
|---|---|---|
| 1,920,246 | Daudt | Aug. 1, 1933 |
| 2,662,860 | Engel | Dec. 15, 1953 |
| 2,809,170 | Cornelius | Oct. 8, 1957 |